REVERBERATORS

Filed Jan. 22, 1964

INVENTOR

HYMAN HURVITZ

BY Hurvitz & Rose

ATTORNEYS

United States Patent Office 3,267,197

Patented August 16, 1966

3,267,197
REVERBERATORS

Hyman Hurvitz, 822 Warner Bldg., Washington, D.C.

Filed Jan. 22, 1964, Ser. No. 339,423
8 Claims. (Cl. 84—1.24)

Figures 1, 2, 3, 4, 5:
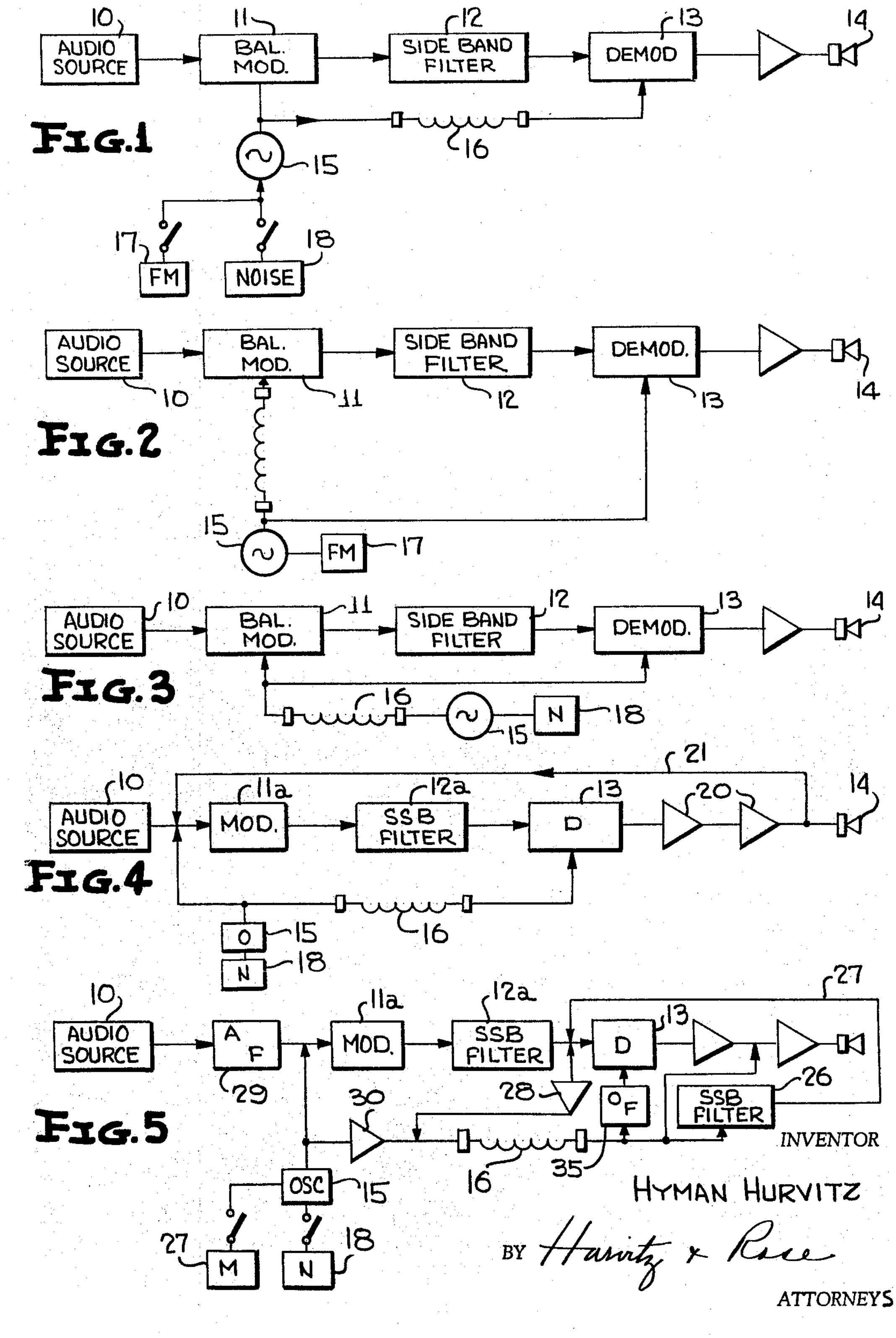

The present invention relates generally to systems for enhancing music and more particularly to systems employing reverberators for randomizing music and imparting chorus effect thereto.

Briefly describing a simple version of the invention, an audio band representing music is converted to an ultrasonic band of frequencies and then converted back to audio frequency. Both conversions are accomplished with reference to a common oscillator, the novel features of the invention then being that a reverberator is interposed (1) between the oscillator and the demodulator alone, or (2) between the oscillator and the modulator alone, or (3) both.

The oscillator is continuously varied in frequency, or in frequency and amplitude, or in amplitude alone, either at a regular rate or in response to noise. Since the heterodyne oscillations as they arrive at the modulator, for species (1), above, are instantaneously equal to the oscillator frequency, while those arriving at the demodulator arrive later, due to the interposition of the reverberator, and moreover arrive after repeated reflections, due to reflections in the reverberator, multiple frequencies will always be present at the demodulator, and these will be continuously in process of varying in relative amplitude and frequency and phase.

Therefore, any single audio frequency present at the inputs of the system is converted to plural randomly related frequencies at the output of the system.

Assume a deviation or swing of 6 c.p.s. at the heterodyne oscillator, varying sinusoidally at 1 c.p.s., and a delay time of .1 second. The variation of output audio frequency may be .6 c.p.s. for each pass of the oscillator output through the reverberator. But this is a maximum value, since the difference between input and output frequencies varies with phase of the deviation, i.e. rate of change of deviation, for the values given. It follows that the output audio frequency will be frequency modulated. The heterodyne oscillator frequency will be reflected from the demodulator to the modulator and back to the demodulator, the trip requiring .2 second, so that the output frequency will be further frequency modulated with a deviation of 1.2 c.p.s. This value of deviation will be added for any given oscillator frequency, for each pass through the reverberator, with a maximum possible deviation of 6 c.p.s., after which deviation decreases by steps. At every instant of the process all the stepped frequencies are present simultaneously, but the successive steps, as they develop, involve attenuation. The net result is therefore an effect which can be called "dense vibrato".

On the other hand, if the heterodyne oscillator is supplied with a noise power supply so that its frequency and its amplitude varies completely at random, so will the output signal vary, with many simultaneous frequencies and amplitudes present simultaneously. The stepped vibrato is thus converted to "white vibrato," by analog to white noise.

By the same reasoning as applies to the presence of noise modulation, if sinusoidal modulation is used but delay time is incommensurable with or prime to the rate of deviation, the output vibrato signal will include plural sinusoidal vibrato components of many different phases. The subjective effect is that of chorus effect. The effect which can be achieved if the delay time of the reverberator is shortened, say to .01 second, while the deviation is increased at the local oscillator, say to 60 c.p.s. is similar to that available for .1 second and 6 c.p.s. except that each successively produced vibrato component will increase in deviation over the preceding, while the local oscillator frequency is varying in one sense. Further, sinusoidal deviation may be combined with noise modulation in both frequency and amplitudes of the local oscillator output.

By means of the present invention a single instrument, such as a violin, can be caused to sound like a violin section of an orchestra, and an entire symphony orchestra can be simulated by a few diverse instruments. This is true because each actual instrument is slightly detuned with respect to the others, in an orchestra, has a different harmonic makeup, and is played with a different vibrato.

It is, accordingly, an object of the invention to provide a novel system for enhancing music.

It is a more specific object of the invention to provide a system for enhancing music in a system employing a common heterodyne oscillator for increasing and then decreasing the frequencies of an audio band, wherein a reverberator is included in the heterodyne oscillator circuit, the oscillator being subject to modulation.

The above and still further objects, features and advantages of the present invention will become apparent upon consideration of the following detailed description of one specific embodiment thereof, especially when taken in conjunction with the accompanying drawings, wherein:

FIGURES 1–5 are block diagrams of various music modulators according to the present invention.

Referring now to the accompanying drawings, in FIGURE 1, 10 is an audio source of music, which is connected to a balanced heterodyne modulator 11, a single side band filter 12, a heterodyne demodulator 13, and a speaker 14. Local oscillator 15 supplies heterodyne signal directly to modulator 11 and via a reverberator 16 to demodulator 13. Oscillator 15 is modulated in frequency by frequency modulator 17, or by providing a noise power supply 18 for oscillator 15. Noise power applied to an oscillator causes random frequency and amplitude variation of its output. Delay time of the reverberator 16 may be from .01 to .5 second, oscillator 15 may be ultrasonic, say at 20 kc. to 30 kc., and frequency deviations at oscillator 15 may be slight, say 6 c.p.s., to 1000 c.p.s., depending on delay times, in accordance with the philosophy above explained.

The system of FIGURE 2 is similar in operation to the systems of FIGURE 1, except that reverberator 16 is in cascade with the modulator and not the demodulator. Placing reverberator 16 in the modulator circuit does not change theory of operation or results.

In FIGURE 3 the reverberator 16 is in series with both modulator 11 and demodulator 13. The reverberator 16, instead of introducing plural delay times between modulator and demodulator, now has the sole function of providing plural local oscillator frequencies simultaneously to both modulator and demodulator. This provides plural ultrasonic frequencies at both modulator and demodulator, which are at all times equal, and hence plural audio output bands. Since precisely the same frequencies are always present at modulator and demodulator, no vibrato modulated audio output is produced. A steady state simultaneous array of heterodyne frequencies is present, which is augmented by the noise modulation applied to the oscillator. A less desirable effect would occur if the modulations were regular, as sinusoidal, but an ever changing simultaneous array of local oscillator frequencies would be present nevertheless. Its contents can be established in terms of oscillator frequency deviation, rate of deviation, and delay time and attenuation of the reverberation.

If, in FIG. 1 an isolating amplifier is placed at the input of the reverberator, different results will be attained then if the amplifier is omitted. With amplifier present, the modulator is unaffected by the presence of the delay line. Without amplifier the modulator is affected, since it is in parallel with the driver transducer of the reverberator, the impedance of which varies with reflected signals delivered to it from the far end of the reverberator.

An obvious expedient, though perhaps uneconomic, is to use a delay line between the oscillator and the modulator, and another between oscillator to demodulator.

Another obvious expedient, especially where small delays are used, and cost is a factor, is to employ a delay circuit having reflection, and perhaps 5% to 10% attenuation per traverse of the signal through the delay line instead of a wire or acoustic reverberator.

Modulation rates of 7 c.p.s. can be utilized to produce dense or stepped vibrato; or slow rates, say of 1 c.p.s. to produce only randomization or chorus effect, the maximum frequency deviation and rate being proportioned to the delay time of the reverberator to produce the many available musical effects. Preferably, if regulator or unnoisy modulation is employed, it should be made variable in both rate and extent.

In FIG. 4, the audio source 10 is connected to heterodyne unbalanced modulator, **11*a*, single side band filter 12*a*, heterodyne demodulator 13, suitable amplifiers 20, and speaker 14, all in cascade. Heterodyne oscillator 15, at about 20 kc., is connected to the input of modulator 11*a*, and also to the input of electroacoustic transducer of wire reverberator 16. The acousto-electric output transducer of wire reverberator 16 is connected in tandem to the detector 13 and to the amplifiers 20. A feedback path 21 extends from the amplifiers 20** to the input of the modulator.

It follows that there are three signal inputs to the modulator **11*a***, i.e. direct audio, direct heterodyne frequency, and reverberated audio feedback.

Analyzing now the operation of the system of FIG. 4, the audio input is heterodyned up in frequency, a side band filtered out of the heterodyne product, and that side band heterodyned back to audio frequency. However, since the heterodyne oscillator frequency is applied directly to modulator **11*a* and is noise modulated in frequency and amplitude the process of heterodyning back via delay line 16 is always accomplished at a different oscillator frequency than was heterodyning up, by some small amount, say 0–5 c.p.s. Thereby, the output audio does not duplicate the input audio precisely, in any respect, and particularly in respect to frequency. Moreover, the delay line, which is capable of handling only ultrasonic frequencies, is arranged to have multiple reflections, with attenuation at each successive pass. Oscillator frequencies are thus randomized at demodulator 13. The feedback path 21 feeds randomized audio back to the modulator 11*a***. This feedback loop cannot cause singing, because no input audio frequency and output frequency are equal except transiently. It is not necessary to feed back oscillator frequency, since in respect to this frequency the function of the delay line is to randomize heterodyne detection. However, oscillator frequency could be fed back if desired, to augment randomization.

What is important and novel in the system of FIG. 4, is that audio is fed back from output to input via loop 21. No danger of singing exists, because the reverberated audio is randomized in frequency by the heterodyne process. The possibility of using a regenerative feedback loop for audio reverberated music implies long reverberation time, with a short wire, an extremely important result. Further, the audio is re-randomized for each pass through the system. Therefore, reverberator resonances will not be audible, and simultaneous chorus effect, randomization, and long reverberation time achieved, by simple means.

The delay line 16 can be employed, as in FIG. 5, to reverberate to signal ultrasonically, and also at audio frequencies. To this end FIG. 4 is modified by adding an oscillator frequency pass filter 35 between the delay line output and the demodulator, and a single sideband filter 26 and feedback loop 27 extending from the output transducer of reverberator 16, to regenerate ultrasonic music. An amplifier 28 connects the input transducer of the reverberator 16 to the output of SSB filter **12*a*, to provide ultrasonic music to the reverberator 16. Audio filter 29 isolates the audio signal and amplifier 30 breaks the loop from SSB filter 12*a* to modulator 11*a***.

The net effect is now that of two reverberations, which are not duplicates because the reverberator has different delay time at audio and at ultrasonic frequencies. Reverberation diversity has been found necessary, as by Hammond, who utilizes three wires of different effective lengths, in tandem, to eliminate resonance effects. The present system, with one wire, can achieve superior results because the one wire has two different effective lengths, and because the audio signal itself is randomized and chorus effect introduced.

It will be clear that switches may be provided in FIG. 5 to discontinue any effects not desired. For example, the audio input circuit to the reverberator may be opened, or the ultrasonic reverberator circuit, or both. Attenuation controls and feedback loops and amplifiers are conventional and would obviously be present in a practical system, but are not shown, to simplify the drawings.

Reviewing, by reference to FIGS. 4 and 5, at the modulator appears a randomized heterodyne oscillator frequency, at 20 kc. normally, but varying also in amplitude. Nevertheless, modulator **11*a* sees only one frequency and amplitude at a time. The demodulator 13 sees plural oscillator frequencies, which are always in process of change. The total number of oscillator frequencies available at any one time at demodulator 13 is determined by the number of reflections introduced by delay line 16, and since successive passes back and forth along the delay line, of any signal, involves attenuation, the signals input to the demodulator has a wide range of amplitude. Moreover, because of the delay and the restless character of the input to line 16**, the modulator and demodulator almost never see the same oscillator frequencies simultaneously, and if they do the coincidence is transient.

We now have a weapon for introducing reverberation feedback (FIG. 4) which is very valuable because it increases reverberation time at will, and also because it enables use of a short wire in the reverberator, which reduce attenuation, externally induced noise, physical mounting problems, space requirements, and the like.

The introduction of random plural frequencies at the demodulator introduces chorus effect into the musical output, which is of particular value if the source 10 is an electronic organ.

The delay line 16 is now also used to introduce reverberation into the audio signal directly and into the audio signal as modulation on an ultrasonic carrier, as in FIG. 5.

A complex interaction among the facilities of FIG. 5 ensues, which is difficult to analyze. For example, assume a steady 1000 c.p.s. audio note. This emerges from the speaker as four or five simultaneous pure tones, in the range 995–1005 c.p.s., but the tones are always in process of change in both amplitude and frequency.

The original steady note at 1000 c.p.s. and the added components are passed to the speaker via a wire reverberator. The steady note comes through with delay and echo, but the remaining frequencies are different in each pass through the reverberator, i.e. each echo is different in detail, in respect to frequencies and amplitudes from every other echo. The differences are slight, but the effects are musically noticeable and pleasant, simulating the interference patterns of true three dimensional echoes, which the conventional reverberator cannot produce. Further, if both audio and ultrasonic reverberation of the audio is employed, reverberation is further enhanced and randomized.

The audio signal, with chorus effect reverberation, and random frequency reverberation, as applicant's novel effects are called, is being continuously reprocessed, as well as the original audio. The latter can cause singing, at first blush. But the modulator-demodulator loop cannot introduce singing because it is randomized. Only the direct audio loop is dangerous. But this proceeds through the delay line only, which provides phase delay and high attenuation, and is always accompanied by random tones which combine with the 1000 c.p.s. tone to break up any singing, i.e. the random component will contain 1000 c.p.s. on a statistical basis, and this 1000 c.p.s. random component will add vectorically with the steady 1000 c.p.s. component at random phase. For singing to occur there must be a steady state feedback of proper phase and amplitude, which must subsist for a fairly long time. If phase is continuously changing from 0′ to 360″ at random, singing cannot establish itself. Further, the echo loop must be one which attenuates as a function of time, as does a true echo. This implies that the loop has attenuation of about 3 db overall, which in itself militates against singing.

The systems of the present invention are not reverberators of the usual type. They represent a complete musical facility, under control of the musican, capable of producing a wide range of effects, i.e. frequency and amplitude randomization, chorus effect, dense vibrato, simulated three dimensional echoes, randomized reverberation, randomized chorus effect, reverberated chorus effect, and random frequency and amplitude reverberation.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A music system for modulating an audio band, comprising a heterodyne modulator, a heterodyne demodulator, an ultrasonic oscillator, an ultrasonic band pass filter connecting said modulator and demodulator, a reverberator operative at the frequency of said oscillator connected between said oscillator and at least one of said modulator and demodulator, and means connecting said oscillator to the other of said modulator and demodulator.

2. The combination according to claim 1 wherein said at least one of said modulator and demodulator is said modulator alone.

3. The combination according to claim 1 wherein said at least one of said modulator and demodulator is said demodulator alone.

4. The combination according to claim 1 wherein said at least one of said modulator and demodulator is both said modulator and said demodulator together.

5. In a music system, a source of an audio frequency band, an ultrasonic reverberator system for said audio band, said ultrasonic reverberator system being of the double heterodyne type including a heterodyne modulator, a heterodyne demodulator, a local oscillator coupled to said modulator and demodulator, means maintaining a frequency difference between oscillator frequency as seen at said modulator and said demodulator.

6. The combination according to claim 5 including means for feeding back audio frequencies from the output of reverberator system to the input of said reverberator system.

7. The combination according to claim 5 wherein said last means includes a reverberative delay device, means providing an audio path from said input of said reverberator system via said delay device to the output of said reverberator system.

8. The combination according to claim 5 wherein said last means includes a reverberative delay device, means providing an ultrasonic signal feedback path around said reverberative delay device.

No references cited.

ARTHUR GAUSS, *Primary Examiner.*

D. D. FORRER, *Assistant Examiner.*